(12) United States Patent
Kyung et al.

(10) Patent No.: US 9,746,587 B2
(45) Date of Patent: Aug. 29, 2017

(54) SHAPE-VARIABLE OPTICAL ELEMENT

(71) Applicant: Electronics and Telecommunications Research Institute, Daejeon (KR)

(72) Inventors: Ki-Uk Kyung, Daejeon (KR); Sung-Ryul Yun, Daejeon (KR); Sun-Tak Park, Incheon (KR); Bong-Je Park, Daejeon (KR); Sae-Kwang Nam, Daegu (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 8 days.

(21) Appl. No.: 14/316,030

(22) Filed: Jun. 26, 2014

(65) Prior Publication Data

US 2015/0062719 A1 Mar. 5, 2015

(30) Foreign Application Priority Data

Aug. 28, 2013 (KR) .................... 10-2013-0102639

(51) Int. Cl.
*G02B 1/06* (2006.01)
*G02B 3/00* (2006.01)
*G02B 3/14* (2006.01)

(52) U.S. Cl.
CPC ............ *G02B 3/0081* (2013.01); *G02B 3/14* (2013.01)

(58) Field of Classification Search
CPC ...... G02B 3/0081; G02B 3/14; G02B 26/005; G02B 26/004; G02B 3/12; G02B 1/06; G02B 13/0075; G02B 7/102; G02B 7/10; G02B 7/08; G02B 7/023; H04N 5/2254
USPC ......... 359/694, 824–825, 250–254, 665–667
See application file for complete search history.

(56) References Cited

U.S. PATENT DOCUMENTS

| 7,256,943 | B1 | 8/2007 | Kobrin et al. | |
|---|---|---|---|---|
| 7,359,124 | B1 | 4/2008 | Fang et al. | |
| 7,605,984 | B2 | 10/2009 | Yeh et al. | |
| 2005/0030438 | A1* | 2/2005 | Nishioka | G02B 26/0825 349/21 |
| 2007/0070476 | A1* | 3/2007 | Yamada | G02B 3/0056 359/9 |

FOREIGN PATENT DOCUMENTS

| KR | 10-0711247 B1 | 4/2007 |
|---|---|---|
| KR | 10-2011-0036105 A | 4/2011 |
| KR | 10-2011-0107812 A | 10/2011 |

* cited by examiner

*Primary Examiner* — Scott J Sugarman
*Assistant Examiner* — Vipin Patel
(74) *Attorney, Agent, or Firm* — Rabin & Berdo, P.C.

(57) ABSTRACT

Disclosed herein is a shape-variable optical element including: a shape-variable lens; a first electrode unit configured to be connected to the shape-variable lens; a second electrode unit configured to face the first electrode unit; and a deformation part configured to be disposed between the first electrode unit and the second electrode unit.

18 Claims, 8 Drawing Sheets

SHAPE-VARIABLE OPTICAL ELEMENT

CROSS REFERENCE TO RELATED APPLICATION

This application claims the benefit of Korean Patent Application No. 10-2013-0102639, filed on Aug. 28, 2013, entitled "Shape-Variable Optical Element", which is hereby incorporated by reference in its entirety into this application.

BACKGROUND OF THE INVENTION

1. Technical Field

The present invention relates to a shape-variable optical element.

2. Description of the Related Art

There is a method of changing a focal distance of a lens using a fluid. According to U.S. Pat. No. 7,359,124 or 7,256,943, convexity of the lens may be controlled by a method of filling a chamber with the fluid.

There is a method of increasing a response speed by combining an electroactive polymer (EAP) with a lens. According to Korean Patent Application No. 2011-7015881, a lens may move by combining the lens with an electroactive polymer.

There is a method of forming a lens changing a focal distance by combining an electroactive polymer with an electrode. According to Korean Patent Application No. 2011-7002815, a structure of a lens may be configured by forming the entire lens using an electroactive polymer and deforming an electroactive polymer material in which an electrode is not disposed due to a deformation which is caused by a pair of electrodes stacked at an edge thereof.

SUMMARY OF THE INVENTION

The present invention has been made in an effort to provide a shape-variable optical element capable of rapidly changing a focal distance and a position of a shape-variable lens in real time.

According to an exemplary embodiment of the present invention, there is provided a shape-variable optical element may include: a shape-variable lens; a first electrode unit configured to be connected to the shape-variable lens; a second electrode unit configured to face the first electrode unit; and a deformation part configured to be disposed between the first electrode unit and the second electrode unit.

The first electrode unit may include at least two electrodes and the second electrode unit may include at least two electrodes.

The first electrode unit may include a 1-1-th electrode, a 1-2-th electrode, and a 1-3-th electrode which are connected to one another, and the second electrode unit may include a 2-1-th electrode, a 2-2-th electrode, and a 2-3-th electrode which are connected to one another.

A portion other than the portion connected to the first electrode portion in a surface of the shape-variable lens may be flat.

The first electrode portion may include a first internal electrode and a first external electrode enclosing the first internal electrode and the second electrode portion may include a second internal electrode and a second external electrode enclosing the second internal electrode.

The first internal electrode and the second internal electrode may have a circular shape.

The deformation part may include an electroactive polymer or a piezoelectric material.

DESCRIPTION OF EXEMPLARY EMBODIMENTS

Hereinafter, exemplary embodiments of the present invention will be described with reference to the accompanying drawings. Hereinafter, substantially same components are each denoted by like reference numerals in the following description and the accompanying drawings and therefore, a repeated description thereof will be omitted. Further, when it is determined that the detailed description of the known art or components related to the present invention may obscure the gist of the present invention, the detailed description thereof will be omitted.

It is to be understood that when one element is referred to as being "connected to" or "coupled to" another element, it may be connected directly to or coupled directly to another element or be connected to another element, having the other element intervening therebetween. On the other hand, it is to be understood that when one element is referred to as being "connected directly to" or "coupled directly to" another element, it may be connected to or coupled to another element without the other element intervening therebetween.

Unless explicitly described to the contrary, a singular form includes a plural form in the present specification. The word "comprise" and variations such as "comprises" or "comprising," will be understood to imply the inclusion of stated constituents, steps, operations and/or elements and not to exclude inclusion or addition of one or more other constituents, steps, operations and/or elements.

Figure 1:
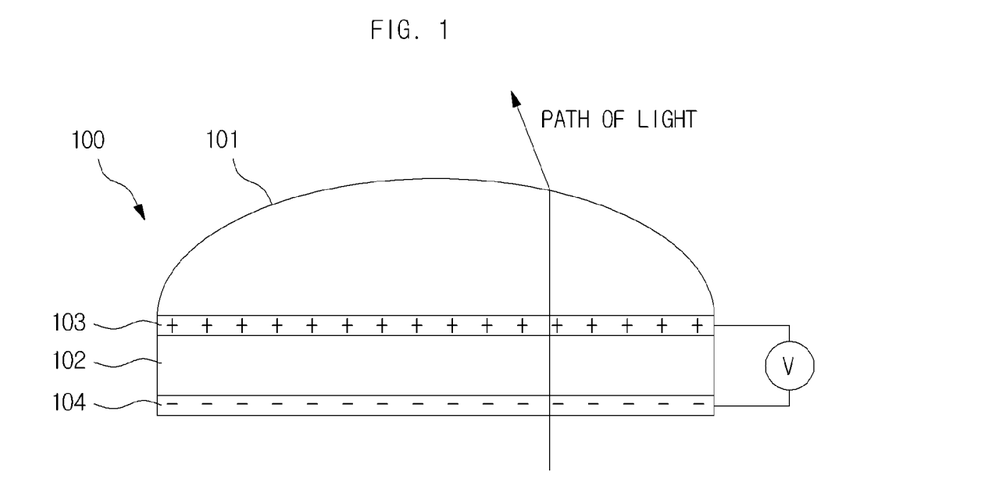
FIG. 1 is a schematic cross-sectional view illustrating a shape-variable optical element according to a first embodiment of the present invention.

FIG. 1 is a schematic cross-sectional view illustrating a shape-variable optical element according to a first embodiment of the present invention.

Referring to FIG. 1, a shape-variable optical element 100 according to a first exemplary embodiment of the present invention includes a shape-variable lens 101, a deformation part 102, a first electrode unit 103, and a second electrode unit 104.

The shape-variable lens 101 has at least one spherical surface like a general lens and is made of a transparent and flexible material. The flexible material is an elastic material which may be expanded or contracted even when being applied with a weak force. According to any exemplary embodiment of the present invention, the shape-variable lens may be prepared by being formed of a thin film, filling a material having an empty space formed therein with a liquid, and formed to have a lens shape.

When the deformation part 102 is applied with an electric field, the deformation part 102 is made of a shape-variable material. For example, the deformation part 102 may be made of an electroactive polymer or a piezoelectric material. According to the exemplary embodiment of the present invention, the deformation part 102 is formed of a film including a transparent and flexible electroactive polymer.

The deformation part 102 has a thin film shape and may have a physically changed shape depending on a form in which a first electrode unit 103 and a second electrode unit 104 which are each disposed on a top surface and a bottom surface of the thin film are charged with charges.

For example, when the first and second electrode units 103 and 104 are supplied with electricity in the state in which the first electrode unit 103 is connected to a positive pole and the second electrode unit 104 is connected to a negative pole, the first and second electrode units 103 and 104 are each charged with positive charges and negative charges. Therefore, an electrostatic attraction is generated between the first and second electrode units 103 and 104. The first and second electrode units 103 and 104 are attracted to each other by being applied with the electrostatic attraction and the deformation part 102 disposed between the first electrode unit 103 and the second electrode unit 104 is applied with a pressure. Since the shape of the deformation part is changed depending on the pressure, a thickness of the deformation part is thinner and a width thereof is wider.

As such, when the first electrode unit 103 and the second electrode unit 104 are charged with different charges and thus an electric field is formed between the first electrode unit 103 and the second electrode unit 104, the shape of the deformation part 104 may be rapidly changed.

Both of the first electrode unit 103 and the second electrode unit 104 are made of a transparent, flexible, and conductive material. Further, the first electrode unit 103 and the second electrode unit 104 are connected to the deformation part 102, and therefore when the shape of the deformation part 102 is changed, the shapes of the first electrode unit 103 and the second electrode unit 104 may also be changed.

Meanwhile, the first electrode unit 103 is also connected to the shape-variable lens 101, and therefore when the shape of the electrode unit 103 is changed, the shape of the shape-variable lens 101 may also be changed. Further, the shape of the first electrode unit 103 is changed with the change in the shape of the deformation part 102. As a result, as the shape of the deformation part 102 is changed, the shape of the shape-variable lens 101 may also be changed.

Further, when the shape of the shape-variable lens 101 is changed, the focal distance or the position thereof may be changed.

On the other hand, the change speed in the shape of the shape-variable lens 101, the change speed in the focal distance or position thereof, and the like may also be controlled by controlling flexibility of the first electrode unit 103 and the second electrode unit 104, flexibility of the deformation part 102, flexibility of the shape-variable lens 101, and the like.

Figure 2:
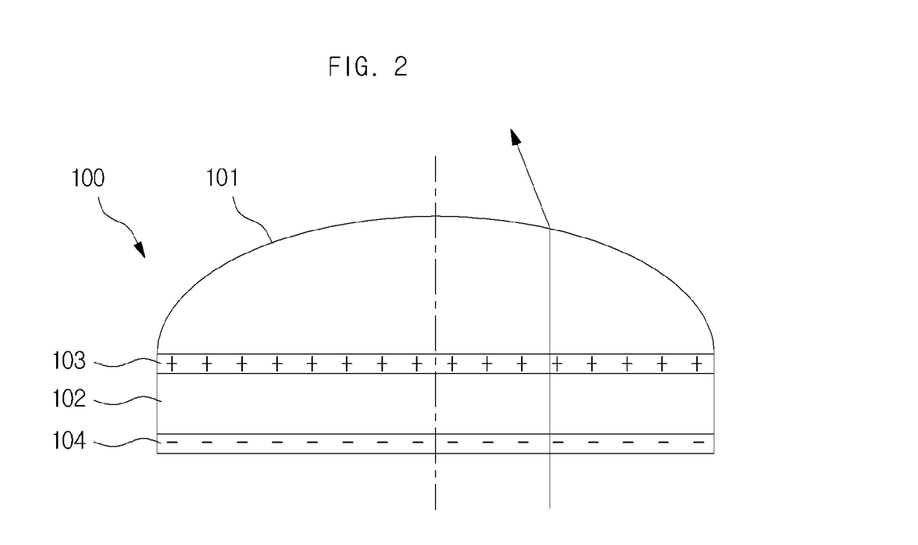
FIG. 2 is a schematic cross-sectional view for describing an operation principle of the shape-variable optical element of FIG. 1.
Figure 3:
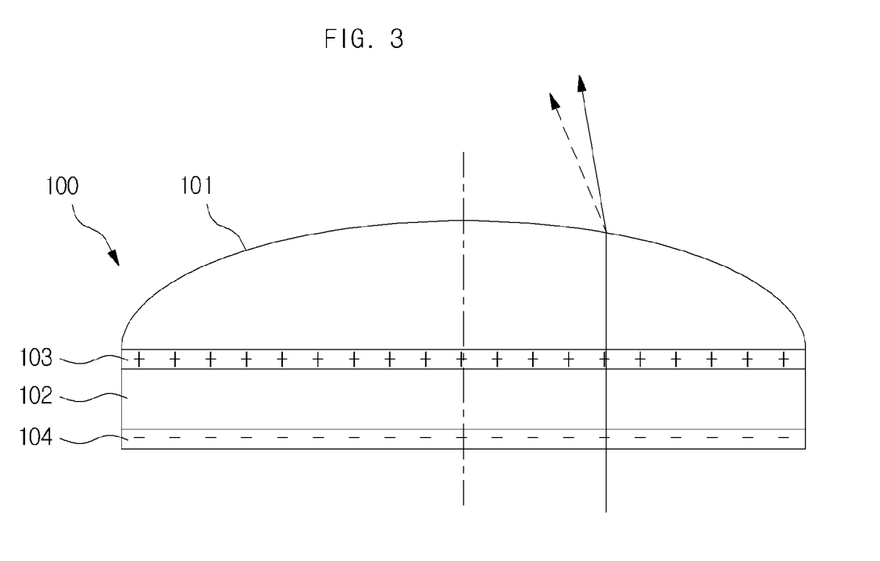
FIG. 3 is a schematic cross-sectional view for describing an operation principle of the shape-variable optical element of FIG. 1.

FIGS. 2 and 3 are schematic cross-sectional views for describing an operation principle of the shape-variable optical element of FIG. 1.

Referring to FIG. 2, when the first electrode unit 103 and the second electrode unit 104 attached to both surface of the deformation part 102 are supplied with a current so as to be each charged with positive charges and negative charges, the thickness of the deformation part 102 is reduced and the width thereof is increased, such that the shape of the shape-variable lens 101 may be changed.

Referring to FIG. 3, when the first electrode unit 103 and the second electrode unit 104 are supplied with a larger amount of current or a potential difference between the first and second electrode units 103 and 104 are larger, a larger electric field is generated, such that it may be appreciated that the deformation of the deformation part 102 and the shape-variable lens 101 may be increased.

Referring to FIGS. 2 and 3, it may be appreciated that the convexity of the shape-variable lens 101 illustrated in FIG. 3 is smaller. Therefore, a refractive index of light transmitting through the shape-variable lens 101 is also changed (see a dotted arrow of FIG. 3). As such, according to the exemplary embodiment of the present invention, the convexity of the shape-variable lens may be controlled, and therefore the shape-variable optical element which may rapidly control the focal distance in real time may be implemented.

Figure 4:
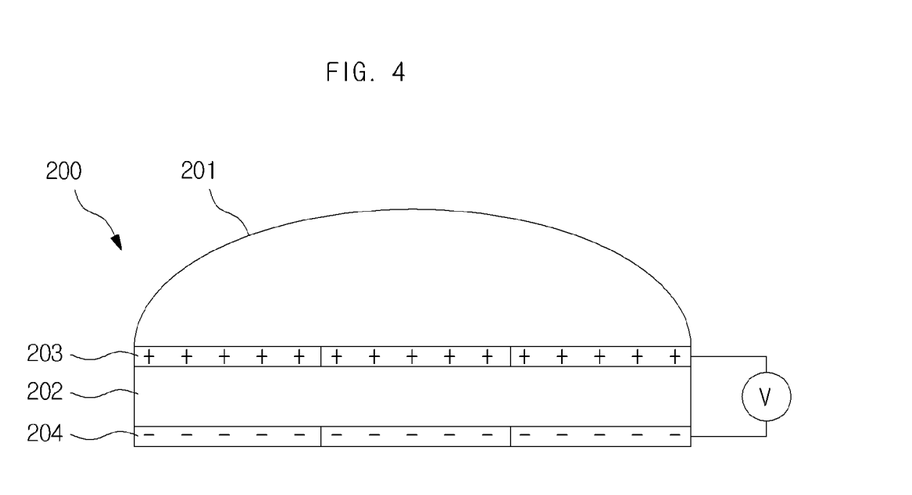
FIG. 4 is a schematic cross-sectional view illustrating a shape-variable optical element according to a second embodiment of the present invention.

FIG. 4 is a schematic cross-sectional view illustrating a shape-variable optical element according to a second embodiment of the present invention.

Referring to FIG. 4, in a shape-variable optical element 200 according to a second exemplary embodiment of the present invention, a first electrode unit 203 and a second electrode unit 204 each include a plurality of electrodes. That is, the first electrode unit 203 includes a 1-1-th electrode 211, a 1-2-th electrode 213, and a 1-3-th electrode 215, and the second electrode unit 204 includes a 2-1-th electrode 271, a 2-2-th electrode 219, and a 2-3-th electrode 221 (see FIG. 5). Further, electrodes 211, 213, and 215 of the first electrode unit 203 and electrodes 217, 219, and 221 of the second electrode unit 204 are disposed to face each other. Meanwhile, the structure and function of the remaining components are the same or similar as and to those of components of the shape-variable optical element according to the first exemplary embodiment of the present invention and therefore the detailed description thereof will be omitted.

According to the exemplary embodiment of the present invention, fine and various changes in the shape of the deformation part 202 may be induced by making the charge amount charged in each electrode of the first and second electrode units 203 and 204 different, such that the fine and various changes in the shape of the shape-variable lens 201 may be induced.

Figure 5:
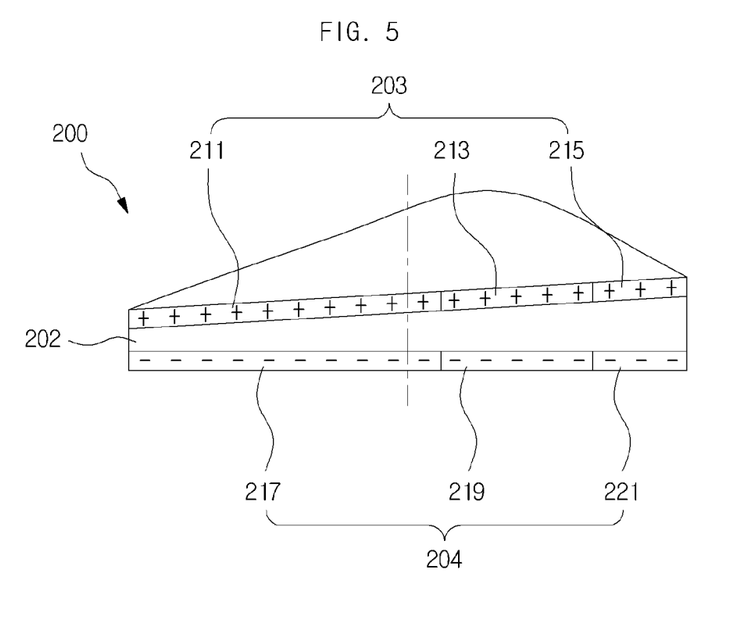
FIG. 5 is a schematic cross-sectional view for describing an operation principle of the shape-variable optical element of FIG. 4.
Figure 6:
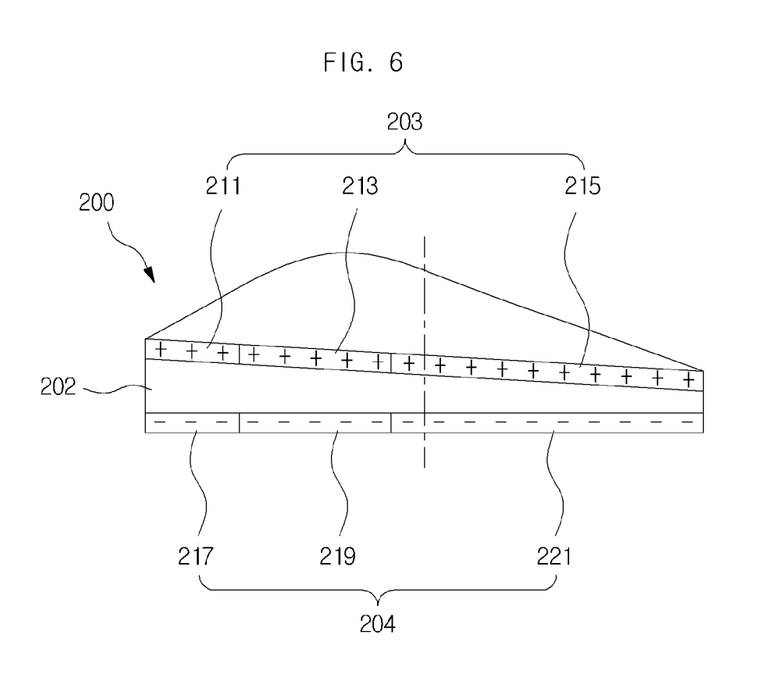
FIG. 6 is a schematic cross-sectional view for describing an operation principle of the shape-variable optical element of FIG. 4.

FIGS. 5 and 6 are schematic cross-sectional views for describing an operation principle of the shape-variable optical element of FIG. 4.

Referring to FIG. 5, the charged charge amount is reduced toward from the left to the right of the first electrode unit 202 and the second part 204. That is, the charge amount charged in the first electrode unit 202 is reduced in an order of the 1-1-th electrode 211, the 1-2-th electrode 213, and the 1-3-th electrode 215 and the charge amount charged in the second electrode unit 204 is reduced in an order of the 2-1-th electrode 217, the 2-2-th electrode 219, and the 2-3-th electrode 221.

In this case, the electrostatic attraction applied between the 1-1-th electrode 211 and the 2-1-th electrode 217 is strongest, and therefore the shape of the deformation part 202 is changed the most between the 1-1-th electrode 211 and the 2-1-th electrode 217. Therefore, the thickness of the deformation part 202 is thinnest and the width thereof is widest, between the 1-1-th electrode 211 and the 2-1-th electrode 217. To the contrary, the shape of the deformation part 201 is changed the least between the 1-3-th electrode 215 and the 2-3-th electrode 221 and therefore the thickness of the deformation part 20 is thickest and the width thereof is narrowest, between the 1-3-th electrode 215 and the 2-3-th electrode 221.

As the shape of the deformation part 202 is changed, the shape of the shape-variable lens 201 is also changed. The shape-variable lens 201 is pulled down left above the 1-1-th electrode and is relatively pulled up right above the 1-3-th electrode 215. As a result, the convex portion of the variable lens 201 move up right, compared with the existing position.

Referring to FIG. 6, the charged charge amount is increased toward from the left to the right of the first electrode unit 203 and the second part 204. Therefore, it may be appreciated that the opposite result to one illustrated in FIG. 5 appears.

Figure 7:
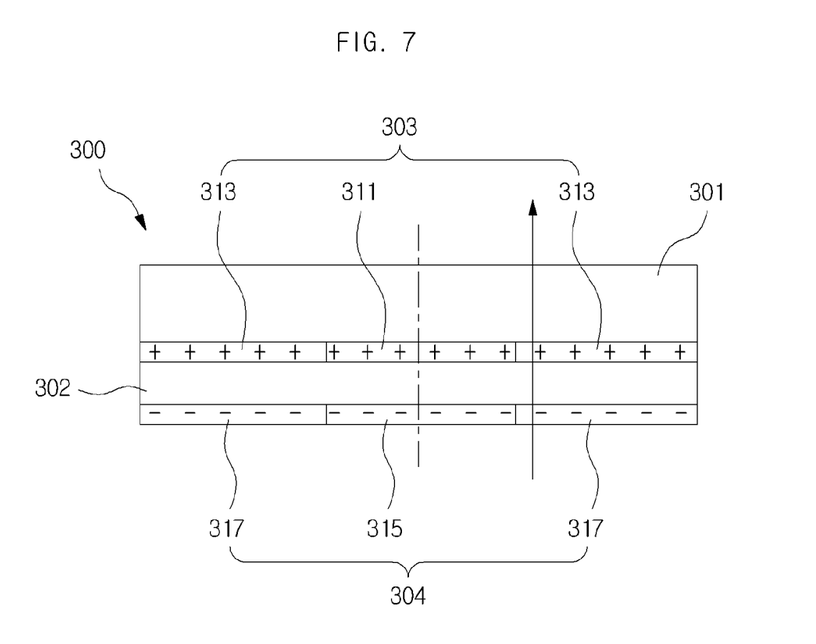
FIG. 7 is a schematic cross-sectional view illustrating a shape-variable optical element according to a third embodiment of the present invention.
Figure 8:
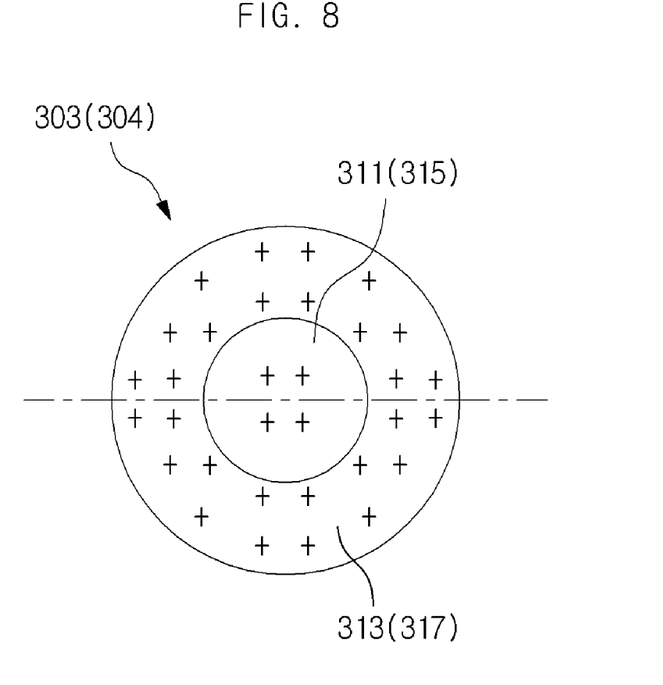
FIG. 8 is a schematic plan view illustrating an electrode unit of FIG. 7.

FIG. 7 is a schematic cross-sectional view illustrating a shape-variable optical element according to a third embodiment of the present invention and FIG. 8 is a schematic plan view illustrating an electrode unit of FIG. 7.

Referring to FIG. 7, in a shape-variable optical element 300 according to a third exemplary embodiment of the present invention, a surface of a shape-variable lens 310 has a plane shape. That is, a convex spherical portion does not appear in the shape-variable lens 301.

Referring to FIGS. 7 and 8, the deformation part 302 is disposed between a first electrode unit 303 and a second electrode unit 304, in which the first electrode unit 303 includes a first internal electrode 311 and a first external electrode 313. The first internal electrode 311 has a circular shape and the first external electrode 313 has a ring shape enclosing the first internal electrode 311. The second electrode unit 304 also includes a second internal electrode 315 and a second external electrode 317 enclosing the same. The electrodes 311 and 313 of the first electrode unit 303 and the electrodes 315 and 317 of the second electrode unit 304 are each disposed to face each other. Another exemplary embodiment of the present invention, the shapes of the first internal electrode and the second internal electrode may have an oval shape or a polygonal shape.

Meanwhile, the structure and function of the remaining components of the shape-variable optical element are the same or similar as and to those of components of the shape-variable optical element according to the first exemplary embodiment of the present invention and therefore the detailed description thereof will be omitted.

According to the exemplary embodiment of the present invention, the charge amount charged in each of the internal electrodes 311 and 315 of the first electrode unit 303 and the second electrode unit 304 is larger than that of each of the external electrodes 313 and 317 to induce the change in the shape of the deformation part 302, such that the change in the shape of the shape-variable lens 301 may be induced.

Figure 9:
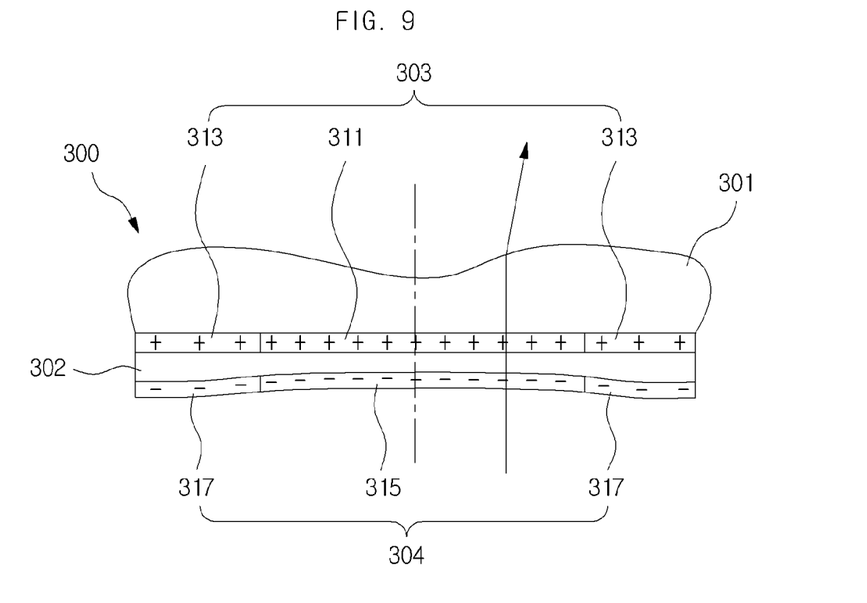
FIG. 9 is a schematic cross-sectional view for describing an operation principle of the shape-variable optical element of FIG. 7.
Figure 10:
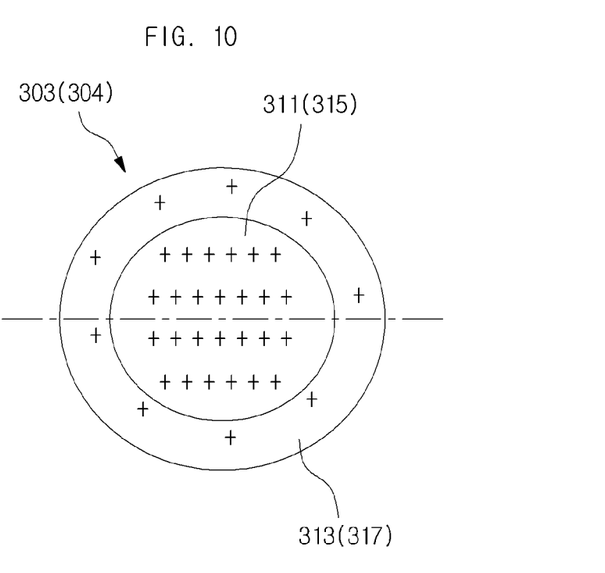
FIG. 10 is a schematic plan view illustrating an electrode unit of FIG. 9.

FIG. 9 is a schematic cross-sectional view for describing an operation principle of the shape-variable optical element of FIG. 7 and FIG. 10 is a schematic plan view illustrating an electrode unit of FIG. 9.

Referring to FIGS. 9 and 10, the first internal electrode 311 is charged with a larger amount of charges than that of the first external electrode 313 of the first electrode unit 302 and the second internal electrode 315 is charged with a larger amount of charges than that of the second external electrode 317 of the second electrode unit 304. Therefore, the stronger electrostatic attraction is applied between the first internal electrode 311 and the second internal electrode 315 and therefore, the shape of the deformation part 302 is changed the most between the first internal electrode 311 and the second internal electrode 315. In detail, the thickness of the deformation part 320 is thin and the width thereof is wide, between the first internal electrode 311 and the second internal electrode 315. On the other hand, the deformation is relatively small at the right and left of the portion.

The central portion of the shape-variable lens 301 is concave and the right and left thereof are relatively convex, by changing the shape of the deformation part 302. According to the present exemplary embodiment of the present invention, the concave lens function may be performed by concavely deforming a flat surface of the shape-variable lens 301.

Figure 11:
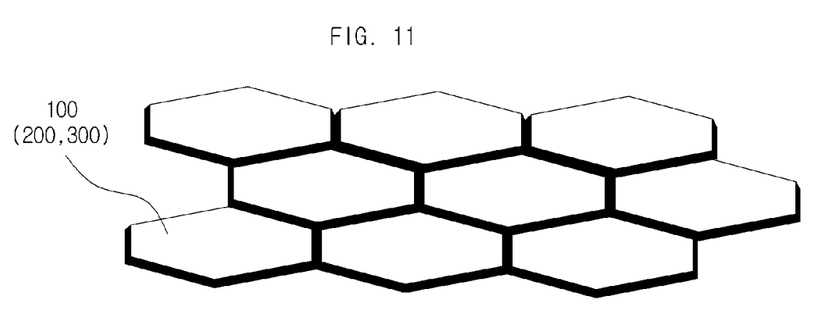
FIG. 11 is a diagram schematically illustrating an array structure in which the shape-variable optical element according to each of the exemplary embodiments of the present invention is provided in plural.

FIG. 11 is a diagram schematically illustrating an array structure in which the shape-variable optical element according to each of the exemplary embodiments of the present invention is provided in plural.

As illustrated in FIG. 11, when the shape-variable optical elements 100, 200, and 300 according to each of the exemplary embodiments of the present invention are arranged on the plane in plural, a multiview, multifocal lens array which may control each focal point in real time may be provided.

According to the shape-variable optical element in accordance with the exemplary embodiment of the present invention, it is possible to rapidly change the focal distance and the position of the shape-variable lens in real time.

The spirit of the present invention has been just exemplified. It will be appreciated by those skilled in the art that various modifications and alterations can be made without departing from the essential characteristics of the present invention. Accordingly, the embodiments disclosed in the present invention and the accompanying drawings are used not to limit but to describe the spirit of the present invention. The scope of the present invention is not limited only to the embodiments. The protection scope of the present invention must be analyzed by the appended claims and it should be analyzed that all spirits within a scope equivalent thereto are included in the appended claims of the present invention.

What is claimed is:
1. A shape-variable optical element, comprising:
a shape-variable lens;
a first electrode unit configured to be connected to the shape-variable lens;
a second electrode unit configured to face the first electrode unit; and
a deformation part configured to be disposed between the first electrode unit and the second electrode unit,
wherein the shape-variable lens includes a first side which faces the first electrode unit and a second side opposite to the first side, wherein both a width of the deformation part and a thickness of the deformation part change when currents are supplied to the first and second electrode unit and an electrostatic attraction is generated between the first and second electrode units, a shape of the first electrode unit and a shape of the second electrode unit change according to a change in the width of the deformation part, and a shape of the second side of the shape-variable lens changes according to a change in the shapes of the first and second electrode units, and wherein the first side is maintained to be flat irrespective of amounts of the currents supplied to the first and second electrode units.

2. The shape-variable optical element of claim 1, wherein the first electrode unit includes at least two electrodes, and the second electrode unit includes at least two electrodes.

3. The shape-variable optical element of claim 2, wherein the first electrode unit includes a 1-1-th electrode, a 1-2-th electrode, and a 1-3-th electrode which are connected to one another, and the second electrode unit includes a 2-1-th electrode, a 2-2-th electrode, and a 2-3-th electrode which are connected to one another.

4. The shape-variable optical element of claim 2, wherein the second side is flat.

5. The shape-variable optical element of claim 4, wherein the first electrode portion includes:
a first internal electrode and
a first external electrode enclosing the first internal electrode, and
the second electrode portion includes:
a second internal electrode and
a second external electrode enclosing the second internal electrode.

6. The shape-variable optical element of claim 5, wherein the first internal electrode and the second internal electrode have a circular shape.

7. The shape-variable optical element of claim 1, wherein the deformation part includes an electroactive polymer or a piezoelectric material.

8. The shape-variable optical element of claim 1, wherein the deformation part includes an electroactive polymer.

9. The shape-variable optical element of claim 1, wherein the deformation part is formed as a single layer interposed between the first and second electrode units.

10. The shape-variable optical element of claim 1, wherein the deformation part is formed as a single layer interposed between the first and second electrode units, and an upper surface of the single layer comes in contact with the first electrode unit and a lower surface of the single layer comes in contact with the second electrode unit.

11. The shape-variable optical element of claim 1, wherein:
the second electrode unit is made of a flexible material; and
the width of the second electrode unit is maintained to be same as the width of the deformation part.

12. The shape-variable optical element of claim 1, wherein:
an entire upper surface of the deformation part is covered by the first electrode unit; and
an entire lower surface of the deformation part is covered by the second electrode unit.

13. The shape-variable optical element of claim 1, wherein:
the first and second electrode unit are made of a flexible material; and
when the width of the deformation part changes, the width of each of the first and second electrode unit increases or decreases to be maintained to be same as the width of the deformation part.

14. The shape-variable optical element of claim 2, wherein the at least two electrodes of the second electrode unit are in direct contact with each other.

15. The shape-variable optical element of claim 3, wherein the 1-1-th, 1-2-th, and 1-3-th electrodes are faced to the 2-1-th, 2-2-th, and 2-3-th electrodes respectively.

16. The shape-variable optical element of claim 5, wherein the first internal electrode is faced to the second internal electrode, and
wherein the first external electrode is faced to the second external electrode.

17. The shape-variable optical element of claim 1, wherein:
the first electrode unit includes at least two electrodes, and the second electrode unit includes at least two electrodes; and
a charge amount charged in a respective one of the at least two electrodes of the first electrode unit is different from each other.

18. The shape-variable optical element of claim 17, wherein
a charge amount charged in a respective one of the at least two electrodes of the second electrode unit is different from each other.

* * * * *